(No Model.)

G. T. CHAPMAN.
CARRIAGE SPRING.

No. 425,162. Patented Apr. 8, 1890.

WITNESSES:
E. B. Bolton
W. J. Morgan

INVENTOR:
Geo. T. Chapman
By A. P. Thayer,
his Attorney.

UNITED STATES PATENT OFFICE.

GEORGE T. CHAPMAN, OF WHITE PLAINS, ASSIGNOR OF ONE-HALF TO WM. HARVEY MERRITT, OF NEW YORK, N. Y.

CARRIAGE-SPRING.

SPECIFICATION forming part of Letters Patent No. 425,162, dated April 8, 1890.

Application filed March 27, 1889. Serial No. 305,029. (No model.)

*To all whom it may concern:*

Be it known that I, GEORGE T. CHAPMAN, a citizen of the United States, residing at White Plains, in the county of Westchester and State of New York, have invented certain new and useful Improvements in Carriage-Springs; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to springs for side-bar and other wagons and carriages, and has for its objects to provide more efficient, reliable, and durable springs with less cost and weight than such as are at present in use, as hereinafter fully described, reference being made to the accompanying drawings, in which—

Figure 1:
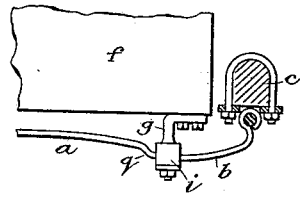
Figure 2:
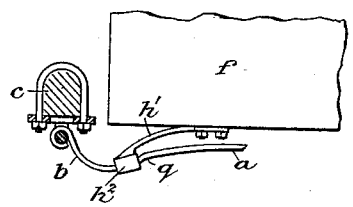
Figure 3:
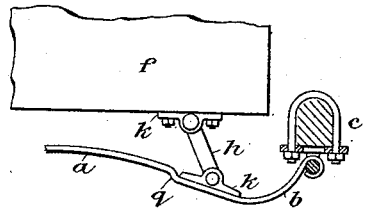
Figure 4:
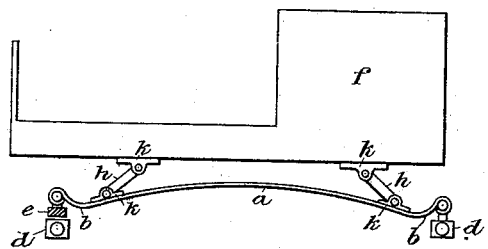
Figure 5:
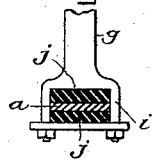

Figure 1 is an end view of part of a wagon-box, transverse section of a side bar, and side view of part of a spring contrived according to my invention. Figs. 2 and 3 are similar views representing modified forms of the standards by which the box is mounted on the spring. Fig. 4 is a side view of a box mounted on side springs of my invention. Fig. 5 is a detail in cross-section of the spring, and on an enlarged scale, illustrating the preferred form of connection of the body-supporting standards.

I make a spring of one single plate, substantially in the form of a half-elliptic spring in the main middle portion $a$, with end portions upwardly curved and pivoted directly and by rigidly-fixed pivots to the side bar or bolster or other support, according as the spring is to be used, the curves extending downward therefrom to the point where the seats of the body-supporting standards are mounted on them, said curves being short and the said points where the standards are mounted being close to where said cams merge in the shape of the middle portion of the spring, which is preferably curved upward between the standards, as in Figs. 2, 3, and 4, but may be downward. The short upwardly-curved parts between the standards and the pivots vibrate in the longitudinal direction of the spring, and thus compensate for the lengthening and shortening of the part subject to flexure between the standards, the said curved end portions serving merely the purpose of vibrating hangers, but having little or no flexing action, and the spring, being so confined at the points where it is subject to greatest strain, is better protected from breaking than without such packing, and, besides, they have greater power in this form for sustaining the load than when contrived in the uniform shape of the rest and jointed at the ends to or suspended in the usual vibrating hangers. The construction is also simpler and cheaper.

I mount the box $f$ or other load to be carried by different forms of standards, as $g$, $h$, or $h'$, or other forms, on said spring, substantially as shown in the drawings—that is, seating the standards on the spring near or about where the main curve merges or begins to merge in the reverse curves of the end portions—arranging the spring either side up, as represented in Figs. 2, 3, and 4—that is, with the main curve upward in the one case and downward in the other case—and either suspending the end from the side bar or other supports or mounting them above the same.

When I use the rigid standards $g$, Figs. 1 and 5, for connecting the body to the spring, I prefer to connect them to the spring by clips $i$ or other approved means, with an elastic packing $j$ clamped on each side of the spring-plate by the clip, which adds somewhat to the elasticity of the spring, but is chiefly useful in favoring the slight elongation and contraction of the spring by the play of normal action, and the spring, being so confined at the points where it is subject to greatest strain, is better protected from breaking than without such packing. The support $h'$ (represented in Fig. 2) may simply bear on the spring-plate, with lips $h^2$ embracing the edges of the plate to keep the support in position. In this arrangement the longitudinal play of the spring is independent of the support.

The jointed standards $h$ may be connected with eye-cleats $k$ or other approved means without elastic packing, the play of the joints affording the requisite compensation for the lengthening and shortening of the spring.

The eye-cleats may be welded on the spring or otherwise connected, as preferred.

I prefer to make a slight offset in the spring in suitable relation to the bearings of the body-supports on it, as at $q$, to prevent lengthwise movement of the spring on its supports or of the body on the spring.

I am aware of the Patent No. 216,939, in which is shown a spring which in general outline somewhat resembles mine; but it differs essentially in these three respects: the ends are not so upwardly curved as to constitute merely vibrating hangers to the rest; the middle portion is re-enforced with other plates, so that it sustains part only of the flexion, and causing material flexion close to the ends, which it is a special feature of my invention to avoid, and the body-supports are placed a considerable distance upward along the middle curve, and said curve is so stiffened under the supports that flexion only occurs at the middle and at the ends of the spring, which arrangements I do not claim.

I claim as my invention—

1. The improved carriage-spring consisting of a single plate of substantially uniform cross-section throughout its length, with the main middle portion made substantially in the form of a half-elliptic spring and the end portions curved upward from the main portions to and connected with supporting-pivots rigidly mounted on the side bar or other support, so as to practically constitute vibrating hangers suspending the rest of the spring, in combination with the carriage-body supports seated on the spring in close proximity to the end portions and where said end curves merge in the main curves, with the main portion entirely free between the standards for and so that it only is subject to flexion, while the end or hanger portions of the springs only vibrate as the length of the spring varies by the flexion of the middle portion.

2. The improvement in spring-carriages consisting of a spring composed of a single plate mounted at its ends on the side bars or other supports and having the body mounted on it by standards resting on it between the middle portion and the ends by the standards clamped on the spring by a clip, with an elastic washer interposed between each side of the spring-plate and the respective parts of the clip, and allowing lengthwise play of the spring in the clip as it lengthens and shortens, as well as forming a cushion to the spring against both the up and down thrusts.

3. The spring consisting of a single plate and having offsets forming shoulders of the plate, in combination with the body-standards seated on the plate contiguous to the shoulders, and so that said shoulders prevent the standards from shifting lengthwise along the plate.

In testimony whereof I affix my signature in presence of two witnesses.

GEORGE T. CHAPMAN.

Witnesses:
W. J. MORGAN,
W. B. EARLL.